United States Patent [19]

Niskin

[11] 3,729,855

[45] May 1, 1973

[54] APPARATUS FOR SEQUENTIALLY DEPLOYING SPECIMEN COLLECTORS AT SELECTED DEPTHS IN A BODY OF WATER

[76] Inventor: Shale J. Niskin, 9400 S. W. 63 Court, Miami, Fla. 33156

[22] Filed: Dec. 9, 1971

[21] Appl. No.: 206,365

[52] U.S. Cl. .............................................43/8, 43/9
[51] Int. Cl. ...............................................A01k 73/02
[58] Field of Search ..............................43/8, 7, 9, 4; 73/421

[56] References Cited

UNITED STATES PATENTS 2,720,047   10/1955   Isaacs ........................................43/7
3,412,498   11/1968   Niskin .......................................43/8
3,461,591   8/1969    Brown et al. ..............................43/8

Primary Examiner—Warner H. Camp
Attorney—Lloyd J. Andres

[57] ABSTRACT

An oceanographic apparatus adapted to be submerged from a craft in a body of water by an end weighted cable for retaining a plurality of compacted specimen collectors for sequential release by remote electric control from the surface craft to descend along the cable to a plurality of predetermined distances for electric deployment for each specimen collector at a predetermined depth when the cable and collectors are towed by a craft or held in a current including automatic means for closing each collector to retain collected specimens therein prior to retraction to the surface by the cable.

6 Claims, 18 Drawing Figures

Patented May 1, 1973

INVENTOR.
SHALE J. NISKIN
BY
Lloyd J. Andres

INVENTOR.
SHALE J. NISKIN

Patented May 1, 1973
3,729,855
7 Sheets-Sheet 3
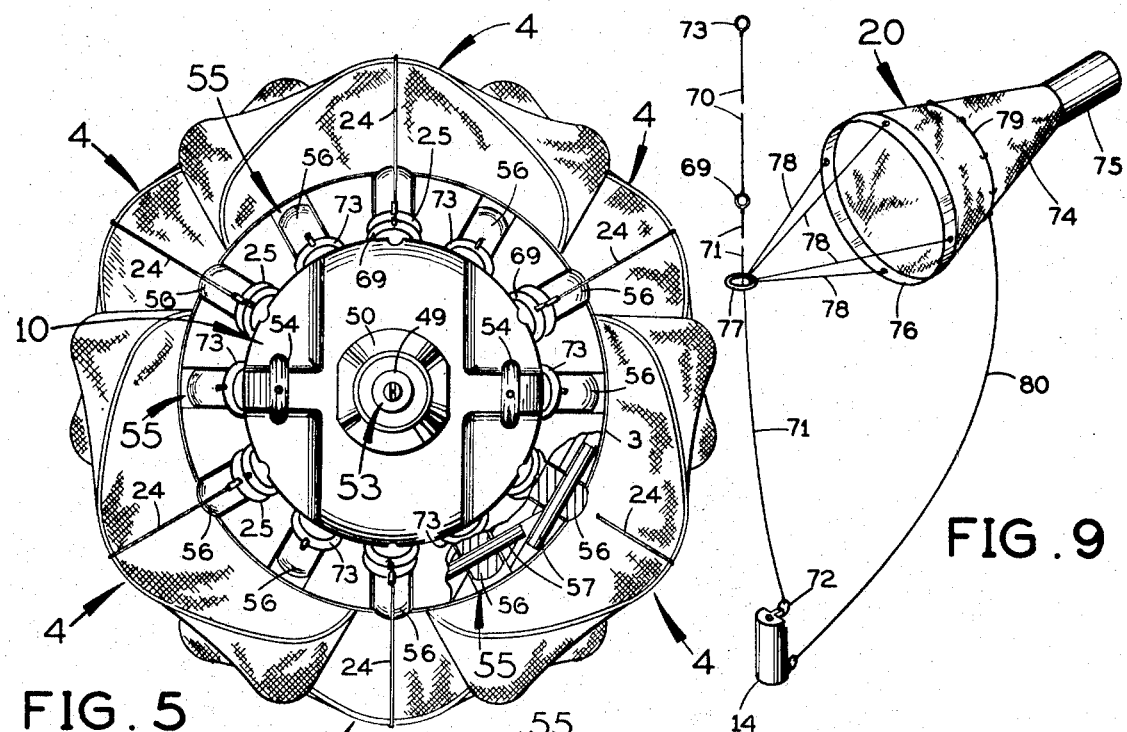
FIG. 5
FIG. 9
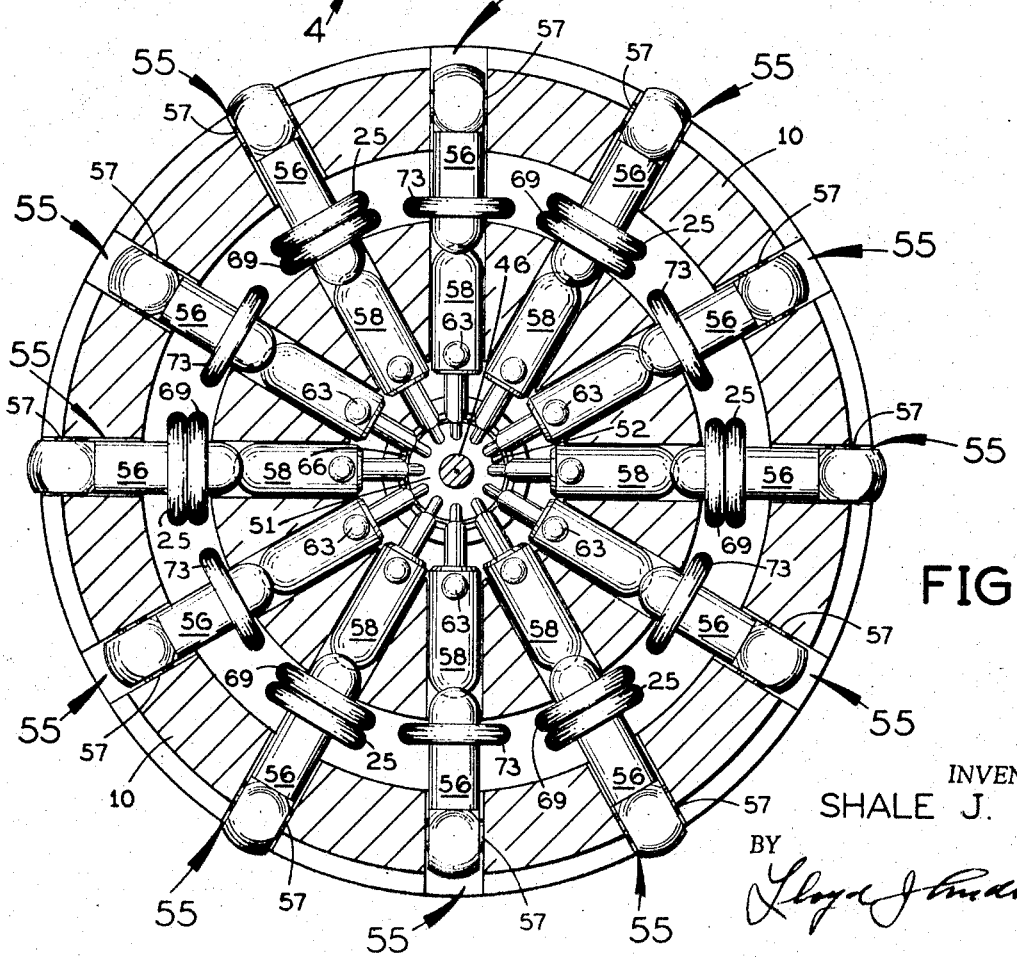
FIG. 6
INVENTOR.
SHALE J. NISKIN
BY
*Lloyd J. Andres*

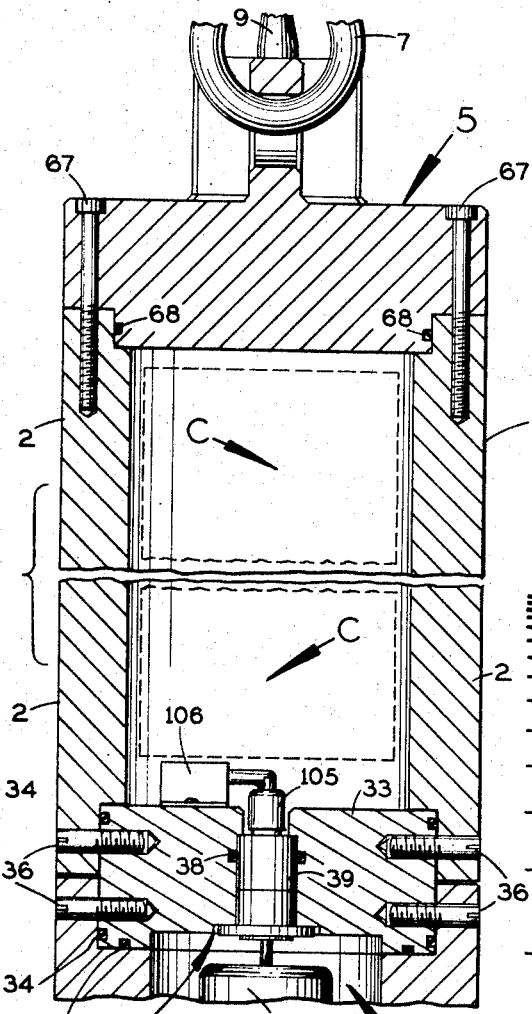
FIG. 7
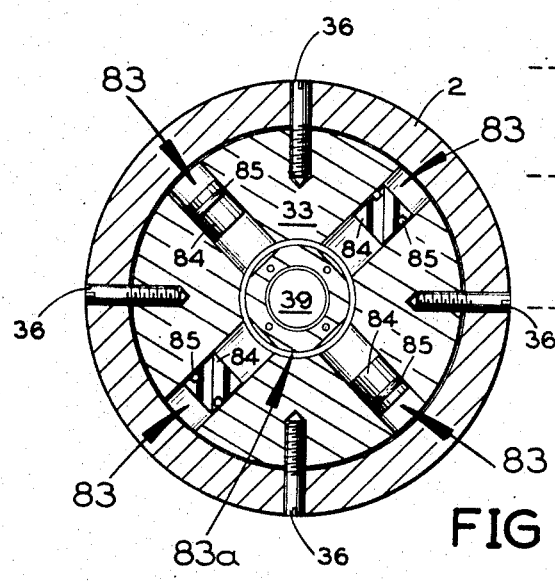
FIG. 8
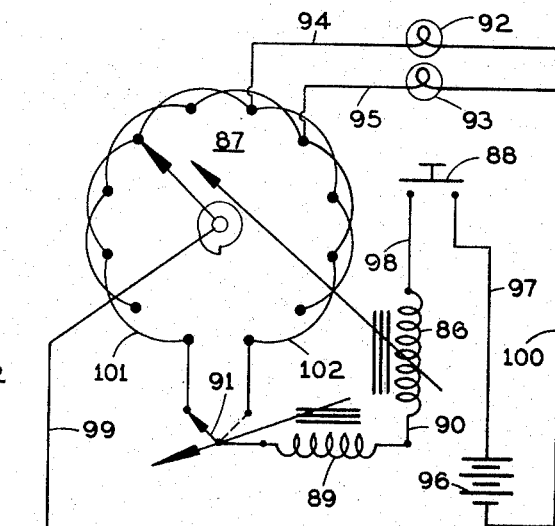
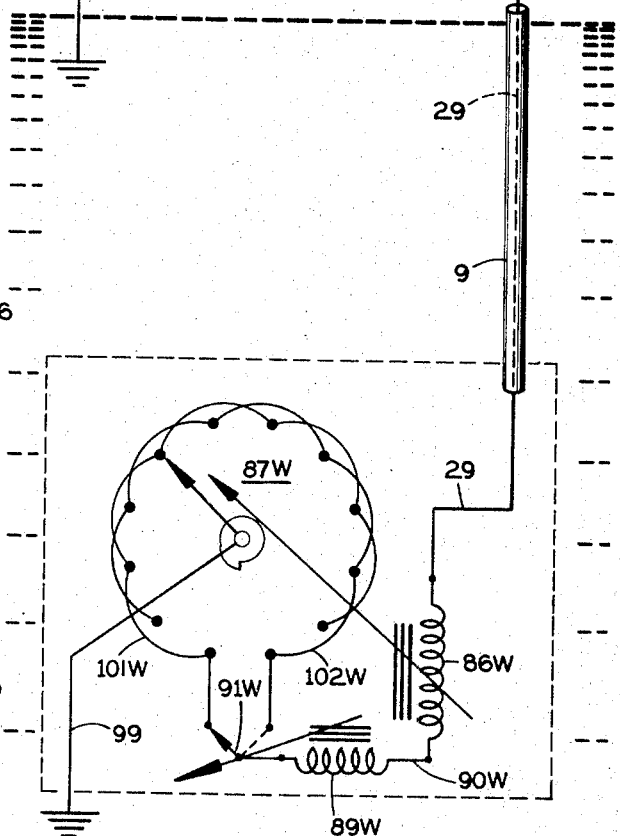
FIG. 10
INVENTOR.
SHALE J. NISKIN
BY
Lloyd J. Andres

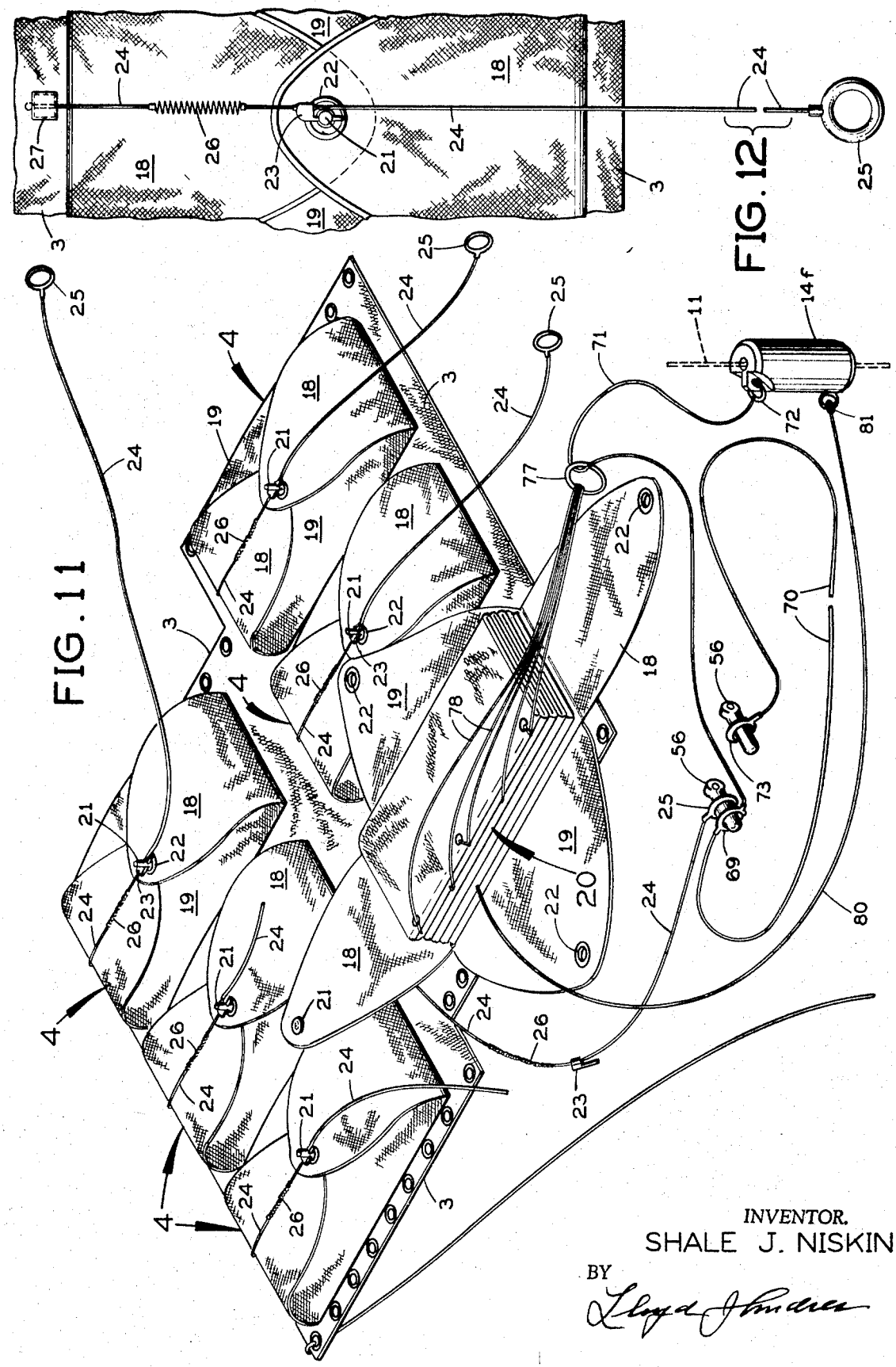

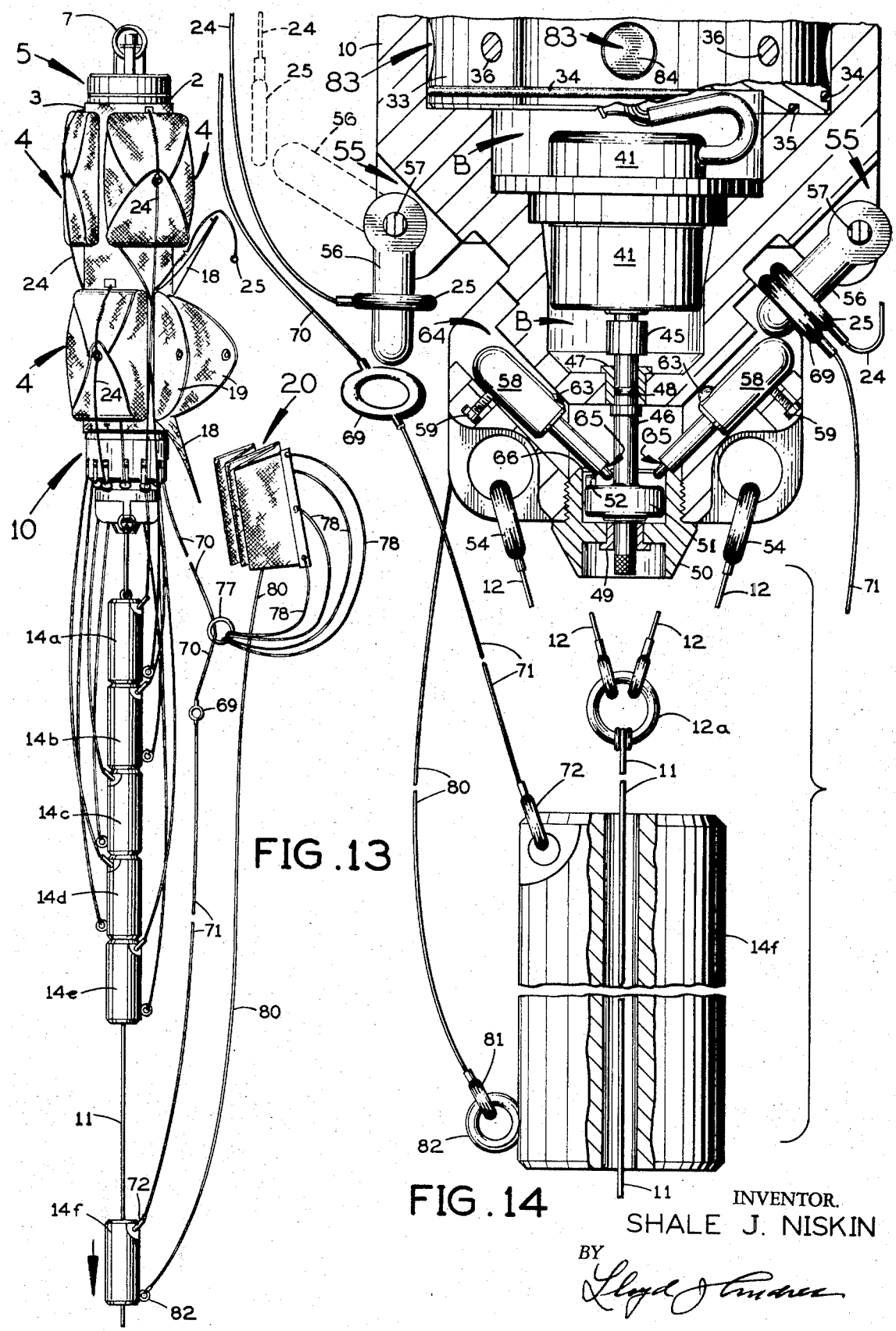

Patented May 1, 1973 3,729,855

INVENTOR.
SHALE J. NISKIN
BY
Lloyd J Andrews

APPARATUS FOR SEQUENTIALLY DEPLOYING SPECIMEN COLLECTORS AT SELECTED DEPTHS IN A BODY OF WATER

This invention relates in general to marine specimen collecting devices for obtaining samples of a wide range of marine life, such as algae, at radically different measured depths and in currents of various velocity.

Reference is had to applicant's pending application, Ser. No. 830,951, filed June 6, 1969 and now U.S. Pat. No. 3,688,433.

The present invention includes improvements for obtaining long sought marine specimens from preselected, measured, extremely great depths in the ocean with a high degree of precision, as well as providing a pressure resistant container means permitting mechanical functions to release and deploy specimen collectors at precise predetermined depths, which container means may include recording devices for current velocity and direction measurement, as well as the temperature and hydrostatic pressure encountered.

A further object of the invention is the provision of electric means in said container operated by the cable and conductor retention of the surface craft to sequentially electrically release specimen collectors at predetermined depths.

Another object of the invention is the provision of a pressure equalizing system in the lower portion of the container for permitting the free rotation of the release shaft which extends through the container when the container is subject to high hydrostatic pressure encountered at great depths.

These and other objects and advantages in one embodiment of the invention are described and shown in the following specification and drawings, in which:

FIG. 5 is a fragmentary enlarged bottom plan view of the container shown in FIG. 1, taken through section line 5—5, FIG. 1.

FIG. 6 is an enlarged top plan view taken through section line 6—6, FIG. 4, showing the collector release elements in latched position.

FIG. 7 is a fragmentary cross sectional view taken through section line 7—7, FIG. 3.

FIG. 8 is a cross sectional view taken through section line 8—8, FIG. 4.

FIG. 9 is a perspective view in reduced scale of a collector assembly in open position.

FIG. 10 is a schematic wiring diagram of the control circuitry in the craft and the responsive circuitry in the container for the release of the collectors.

FIG. 11 is a perspective developed view of six specimen collector pouches with one thereof showing a compacted collector and its associated elements.

FIG. 12 is a fragmentary side elevation of a pouch retained in closed position on the container.

FIG. 13 is a greatly reduced side elevation of the collector apparatus with one collector released from the pouch.

FIG. 14 is a fragmentary cross sectional side elevation illustrating the electric release of a pouch.

Figure 1:
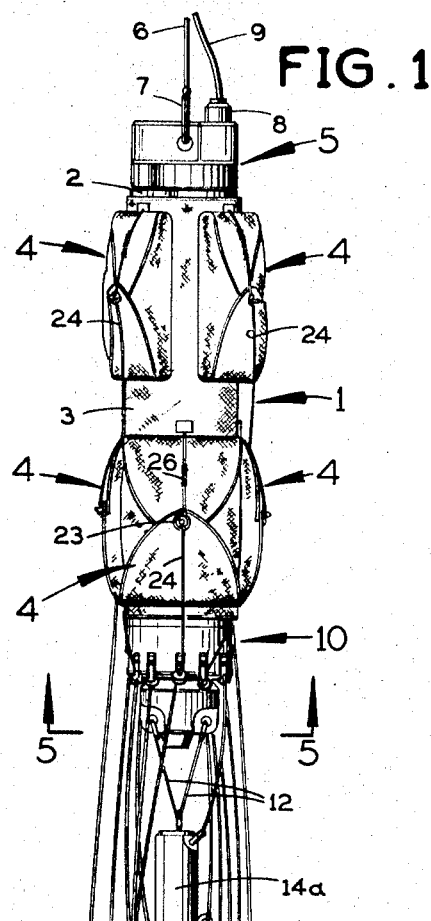
FIG. 1 is a fragmentary side elevation in reduced scale of the complete apparatus for sequentially collecting marine specimens from different depths in a body of water.

FIG. 1 illustrates a specimen collection assembly 1 which includes a cylindrical hollow tubular body 2 for containing a mensuration apparatus and a flexible wrap-around sheet retainer 3 secured to body 2 for holding six pouches 4 secured thereon for removably retaining compacted specimen collectors with the means for dispensing collectors, to be hereinafter described. The wrap-around container provides for convenient interchanging of various types of specimen collectors.

The upper end of the body 2 has hermetically secured thereon a cylindrical coaxial top closure member 5 to which is secured a suspension cable 6 by means of a fastener or ring 7 in a suitable aperture and a hermetically sealed insulated electric plug 8 from which extends a waterproof insulated electric conductor 9 to the craft.

A generally cylindrical bottom housing 10 is hermetically sealed in the lower end of said body and includes a specimen container release apparatus to be hereinafter described. A combination stabilizing and main deployment cable 11 is secured in a Y connection 12 to a pair of spaced holes in the lower end of housing 10, as shown. The lower end of the cable terminates in a ballast weight 13, for stabilizing the angle of the apparatus from vertical when towed or in a current. A plurality of cylindrical weights 14a, b, c, d, e, f, are slidably retained on cable 11 and normally held in an idle position, as shown in FIG. 1.

Figure 2:
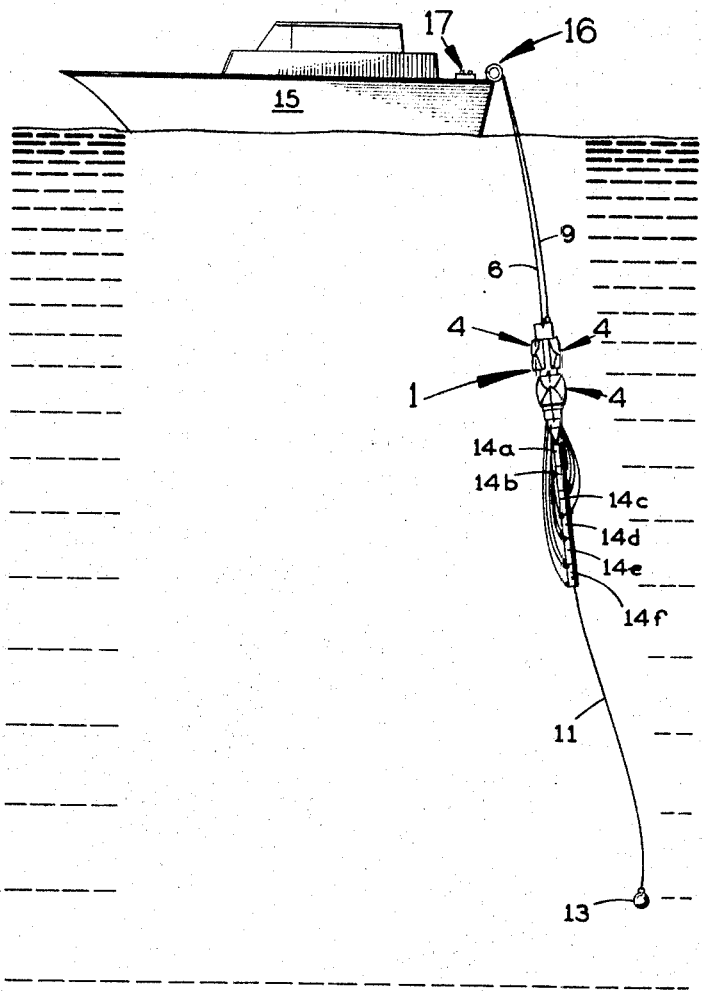
FIG. 2 illustrates in reduced scale the apparatus shown in FIG. 1 submerged in a body of water by a cable from a craft.

Referring to FIG. 2, a specimen gathering water craft 15 illustrates the initial descent of the specimen collection assembly 1 in a body of water under the influence of gravity and the ballast weight 13 prior to the release of any specimen collection apparatus which is lowered by suspension cable 6 to a predetermined depth by adjustment of winch means 16, which is also synchronized with electric conductor 9 of the electric circuit for the sequential release of the collectors by manually controlled electric control apparatus 17, on board the craft.

Figure 3:
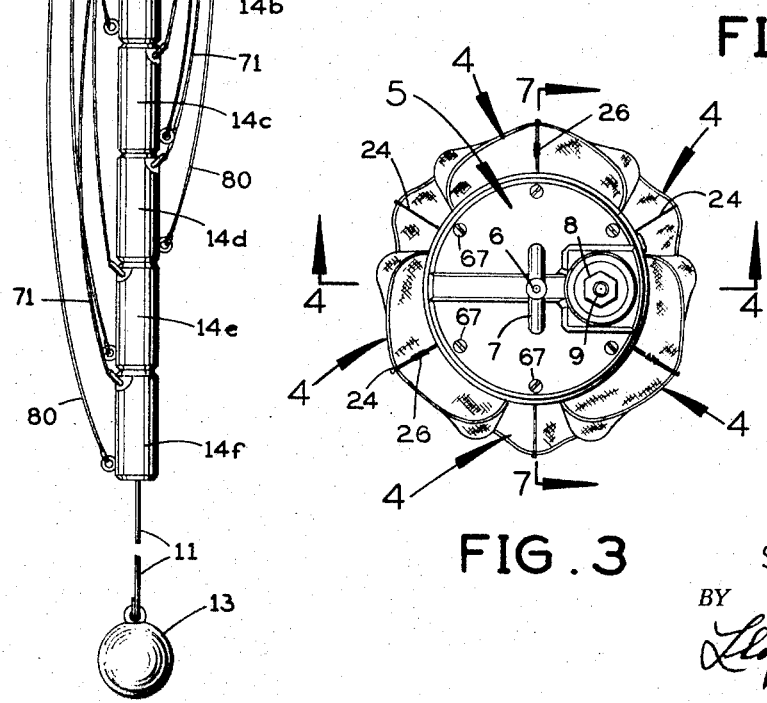
FIG. 3 is a top plan view of the container shown in FIG. 1 with the supporting and electric cables cut away.

FIG. 3 is a top plan view of the specimen collection assembly with the closed pouches in place and supported by craft 15 and cable 6 and connected by electric conductor 9. The six specimen collecting pouches shown in this embodiment are secured to a flexible reinforced plastic sheet retainer adapted to be secured around the body 2 of the collection assembly by well known means. Each pouch has a pair of opposite flaps 18—18 and 19—19, better shown in FIG. 11, which when folded in overlapped relation, as shown, will retain one compacted specimen collector 20 from which various lines extend from each pouch, to be hereinafter described.

Referring to FIGS. 11 and 12, the release device for each pouch shows a stud 21 secured in one flap 18 for each pouch and which loosely projects through a grommet 22 which is crimped into each flap 18 and 19. An offset flap release pin 23 is slidably positioned through a vertical transverse hole in the outer portion of each stud 21. A release line or wire 24 terminates in a pouch release ring 25 and is responsive to spring 26 in series with the upper wire 24 which is fixed to retainer 3 by a patch 27 on the sheet retainer for securing the expanded head on the upper end of the wire 24.

It is now apparent that when the ring 25 is constrained against the tension of spring 21, the pin 23 will maintain a locked position in stud 21 and the free release of ring 25 will permit the spring 26 to retract stud 21 and permit the flaps 18—18 and 19—19 to open and release the compacted collector assembly to descend by gravity from the pouch, as illustrated in FIG. 13.

Figure 4:
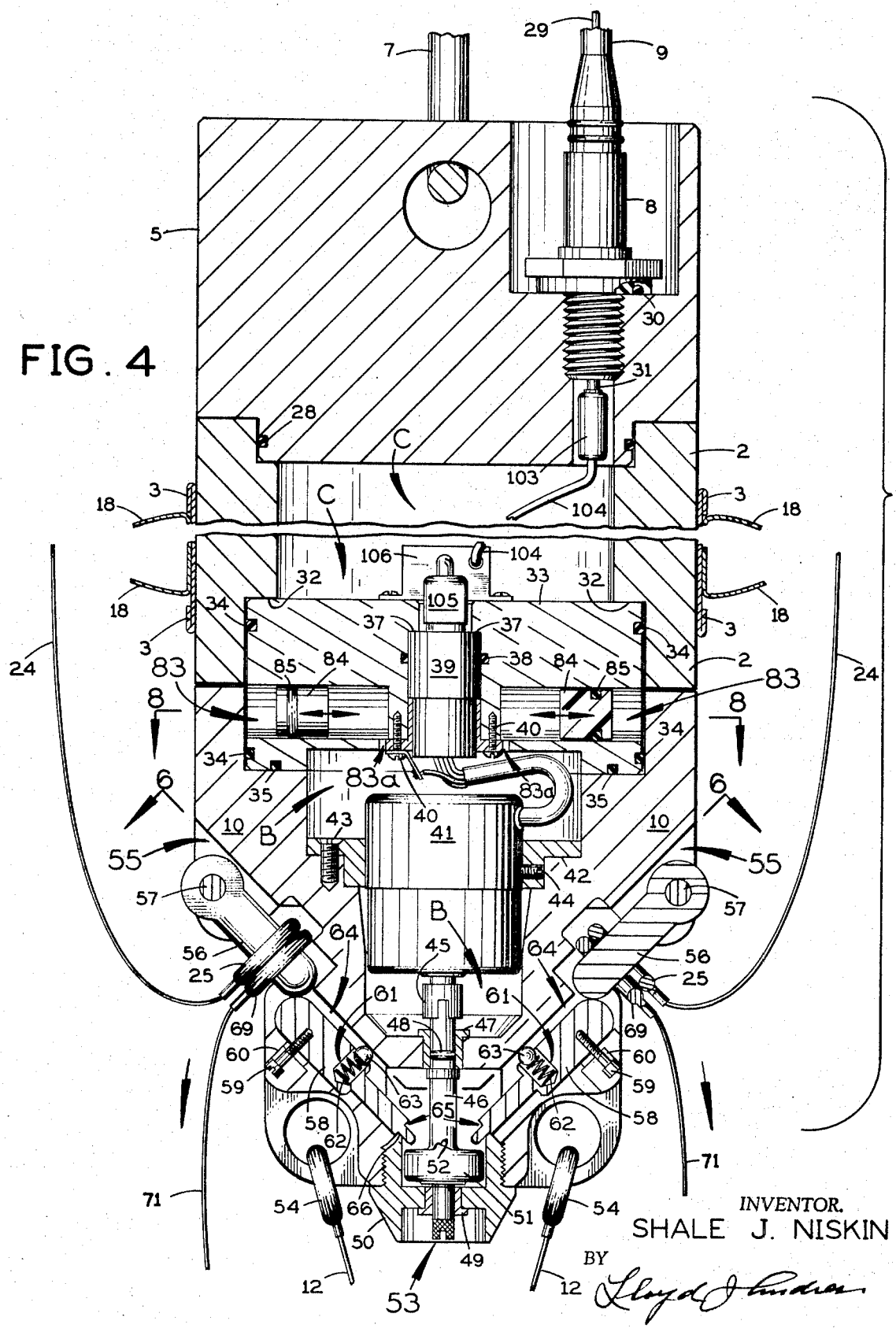
FIG. 4 is a fragmentary normal scale cross sectional elevation taken through section line 4—4, FIG. 3.

Referring to FIGS. 4, 5, and 6, and specifically to FIG. 4, the body 2 is broken away showing the hollow chamber C—C which provides space for various recording devices, such as velocity, flow direction, depth, and temperature, etc.

Again referring to FIG. 4, the lower end of the closure member 5 is provided with a stepped junction into the upper end of body 2, as shown, which includes an appropriate groove for an elastomer O-ring 28 for pressure sealing the junction. The conductor 9 in this particular embodiment requires a single conductor 29 which traverses through the electric plug 8, made of insulating material, threaded into closure member 5 which includes an elastomer O-ring 30 as a seal with the conductor terminating in a pin 31 which is adapted to receive a pull-apart socket, to be hereinafter described.

It is obvious that when the electric apparatus for recording electric data is used within the body 2, then the plug 8 and conductor 9 include multi conductors for energizing the recording apparatus. The housing 10 which includes electric operated apparatus for the deployment of the six collectors, has a coaxial cylindrical bore therein mated with a bore of like diameter in the lower end of the body 2, as shown in FIG. 6, including a shoulder 32 therein. A cylindrical plug 33 is cloosely fitted with a pair of spaced grooves in the outer periphery thereof for retaining a pair of elastomer O-rings 34 and a coaxial circular groove on the lower face of the plug for retaining an elastomer O-ring 35.

FIGS. 7 and 8 show two sets of four spaced radial screws 36 through body 2 and threaded into the outer periphery of the plug 33 for securing the upper closure member 5 to the lower end of the body 2. The plug 33 has a central bore therethrough of two diameters forming a shoulder 37, best shown in FIG. 4, and having an internal peripheral groove around the large diameter of the bore for retaining an elastomer O-ring 38, which is adapted to receive a cylindrical electric plug 39 which is secured in the bore by a pair of screws 40, as shown. Thus, the chamber C within the body 2 and the chamber B in the housing 10 are hermetically sealed from each other.

Referring to FIG. 7, the top closure member 5 is secured to the body 2 by screws 67 and sealed to an inset portion by an O-ring 68.

Again referring to FIG. 4, an electro-magnetic stepping motor 41 having twelve stepping positions is supported in coaxial relation in chamber B by a flange member 42 by three screws 43 and two set screws 44 with only one of each appearing in FIG. 4. The electric conductors of the motor are connected to plug 39, as shown, with the exception of the ground lead, which is connected to the ground screw 40, which in turn is electrically common to housing 10. The slotted output shaft 45 of the motor is coupled to a tongue of a cam shaft 46, which shaft is secured for rotation through a bearing 47 containing a hermetically sealed 0-ring 48 which is also journalled in a bearing 49 in a coaxial latch seating member 50 coaxially threaded in the end of lower housing 10. The latch surface is conical and coaxial with the axis of shaft 46. The motor is provided to rotate a cam 51, having an upward sloping projection 52, secured on the lower portion of the shaft 46 which extends from the chamber B. The shaft terminates in a knurled slotted end 53 for the purpose of manually rotating the shaft for test and initial setting. The two upper Y connections 12 of the cable 11 terminate in a pair of rings 54—54.

Referring to FIGS. 4, 5, and 6, twelve radial slots 55 are provided in a convergent conical form in the lower end of the housing 10. Each slot retains a line release lever 56 pivotally retained on transverse pins 57. A latch 58 is positioned beneath and corresponding with each line release lever 56 by an adjustment upper stop screw 59 which bears against one side of a bore 60 in housing 10 and includes a bore 61 in a side opposite screw 59, which contains a coil spring 62 and a ball 63 bearing against the upper portion of a bore 64, which retains each latch 58. The lower end of the latch 58 is provided with a latching shoulder 65 which when cocked engages the edges of a coaxial conical latching surface 66 around the upper periphery of the latch seating member 50. In this latch position, the outer end of the latch serves to hold the lever 56 in its line holding position.

Referring to FIGS. 9 and 11, the deployment and recovery of each specimen collector is dependent upon the release of slidable fastener rings from the levers 56. It is to be understood that the fasteners may be of other type than the metal rings shown and it is clear that each ring 25 which holds each pouch in closed position is sequentially positioned on each alternate lever 56 when in holding position, together with fastener ring 69, which is secured in a portion of the deployment line 70, which terminates in a ring 73 positioned on each alternate remaining lever 56 in holding position. The remaining portion of the deployment line 71 is secured to noose 79 and passed through the shroud 78 of tow ring 77 of each container and terminating in a ring 72 secured to the upper portion of each weight 14. The net body 74 is opened by the action of the water against the conical rim 76 and the flexible cylinder 75 for holding the specimens, which may be of porous material.

A line 80 is secured to each closure noose 79 around the mid-portion of each specimen collector on a ring 81 attached to the end of the line, which is secured to ring 82 at the lower end of each said weight 14.

It is well known that an air filled cavity, such as shown in housing 10, with a rotary shaft extending therethrough regardless what character of seal used, will not function nor will the seal withstand the super high pressures of the water encountered at great depths, such as 3,000 – 10,000 feet. This problem is overcome in the present invention by the provision of four lateral bores 83 in plug 33. The other ends of the cylindrical bores communicate with the outer water through the small unsealed opening between the bottom circular edge of body 2 and the mating upper circular edge of housing 10. Each of the bores 83 have slidably positioned therein a free plastic piston 84, preferably made from nylon, and grooved to retain an elastomer O-ring 85. The inner end portion of each bore communicates to the chamber B in the housing through the circular opening 83a.

The entire chamber B is filled with a medium to high viscous chemically neutral oil which fills all empty space including that within the motor 41 whereby the pressure exerted against the seal of shaft 46 is exactly neutralized by oil pressure resulting from the inward movement of the pistons 84 due to the water pressure applied to the cylinders through the junctions of the body 2 and the housing 10. Thus the shaft 46 and projection 52 is free to move without excessive restriction.

In view of the pressure of oil in the chamber B, O-rings of oil resistant material, such as Neoprene, are necessary.

Although there are many electric circuits for operating the stepping motor 41 for movement from a surface craft via cable, an effective circuit is shown in FIG. 10, wherein like magnetic rotary switches are used in both surface and the specimen collection assembly, the schematic of which provides an electro-magnetic stepping switch motor 86–87 energized by a manual momentary switch 88 and a two position single pole double throw impulse relay 89 with one terminal thereof connected in series with the electro-magnet of the step switch by a conductor 90 and the remaining terminal of the impulse switch connected to the oscillatory blade 91 thereof. A pair of different colored electric lamps 92 and 93 are connected to any adjacent pair of contacts on the motor 87 by conductors 94 and 95 and a source of electric power 96 and one terminal connected to momentary switch 88 by conductor 97 with the remaining terminal of the switch connected to the remaining terminal of the step switch motor by conductor 98.

The rotary blade of the step switch motor is connected to ground which is the body of water by a conductor 99 and the remaining terminal of the source of power is connected to the lamps by a conductor 100. One contact of the impulse relay 89 connects to each alternate contact of the step switch 87 by a conductor 101 and the remaining contact of the impulse switch connects to the remaining alternate contacts by a conductor 102. The conductor 100 connects to the insulated conductor 9 and the remaining terminal of the source of power 96 and connects to one terminal of the electro-magnetic step switch 86w–87w, which is identical to the previously described step switch. The remainder of the electric elements shown in the dotted outline in housing 10 are identical to those previously shown.

The electric connections in the apparatus begin with conductor 29 terminating through plug 8 in a pin 31 on which a connector 103 carries a conductor 104 into box 106 for relay 89w and blade 91w and its related conductors are coupled to motor 41 through plug 105 attached to multi-plug 39, best shown in FIG. 4.

It is therefore apparent that the segmental rotation of the motor 41 will sequentially trip each latch 58 and permit the corresponding lever 56 to disengage therefrom and permit any fastener thereon to disengage.

Figure 15:
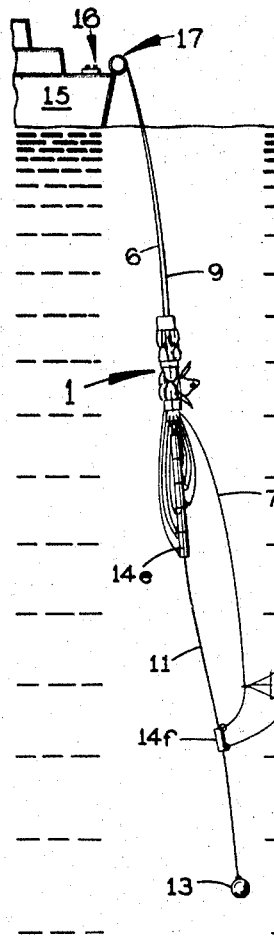
FIG. 15 illustrates the first of a sequence of released collectors approaching contact with its weight.
Figure 16:
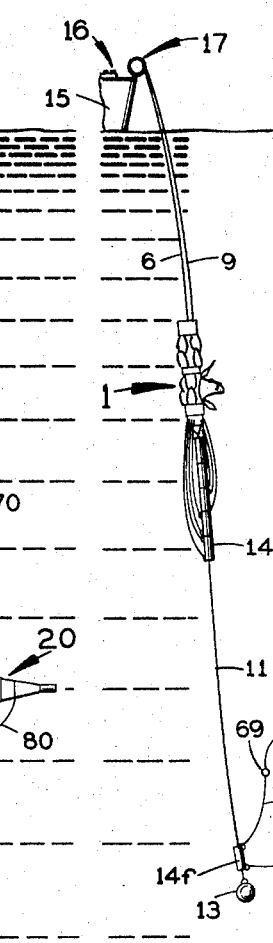
FIG. 16 illustrates the further descent of the released collector and the action of the choke means for closing same to retain the specimens therein.
Figure 17:
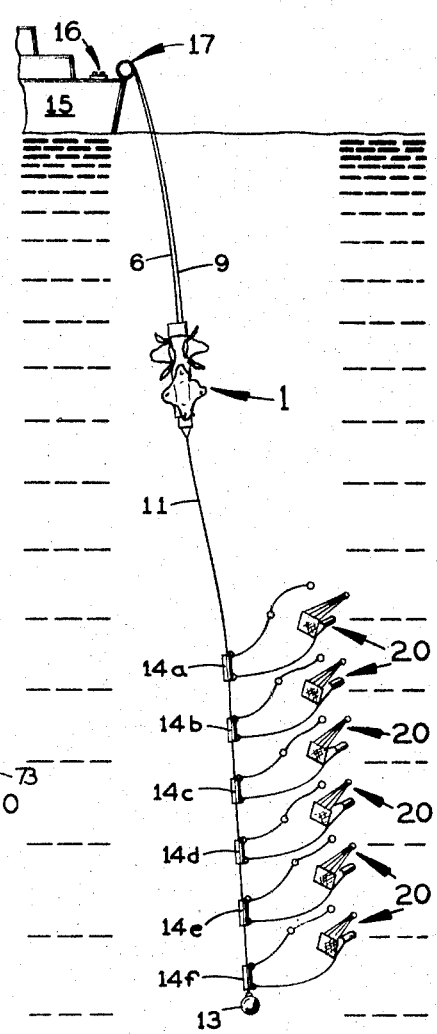
FIG. 17 illustrates the release of all six specimen collectors for closure by a choke means approaching the stacked position of their lead weights.
Figure 18:
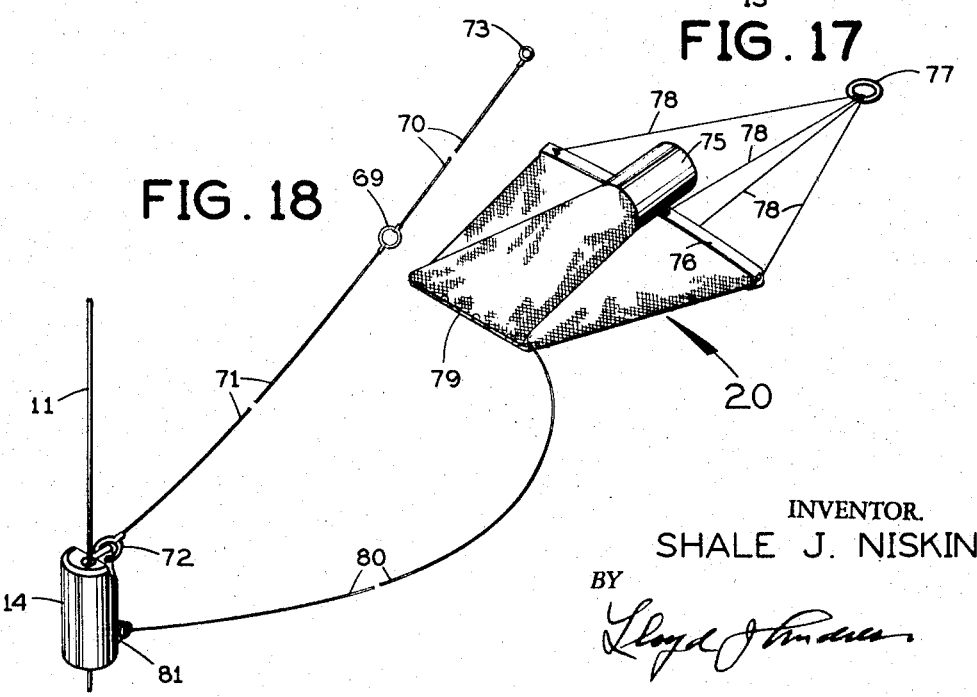
FIG. 18 is a perspective illustration of the position assumed by each collector when subject to retraction by the cable to the craft.

Referring to FIG. 1, it is apparent that when the apparatus is in its initial position the lines from each collector in each housing have a different predetermined length in order to provide an end to end relation of the six weights 14 and to provide different depths of deployment in their gravity movement down the cable 11. Under the assumption that the shaft 53 is positioned to first release the collector corresponding with the lowermost weight 14f, then the entire apparatus is lowered by winch means 16 from the craft to the desired depth and towed at a desired velocity or positioned in the path of a current in the water, the momentary switch 88 is operated one cycle which will simultaneously release a corresponding lever 56 to discharge a first collector from its pouch and permit same to descend by gravity along the deployment line 70 and open in close proximity to the arrested descent of the first weight 14f, shown in FIG. 15, whereby specimen collection will occur.

The next operation of the momentary switch 88 will release the first adjacent lever 56 and permit the deployment line fastener 73 to descend, which will also permit the line 70 to disengage from the tow ring 77 and also effect the choke action of the noose 79 by means of the restraint of line 80, thus captivating specimens within the collector. This sequence of operation may be continued in close or distant areas under tow, as desired, however it is apparent that instead of alternately deploying and releasing and closing each collector, it is practical to release all collectors along cable 11 at periodic intervals and then releasing and closing each collector in sequence by merely changing the sequential arrangement of the rings on the levers 56 and omitting the impulse relay 89 and connecting all contacts to one conductor.

It is to be understood that certain modifications in construction are intended to come within the teachings and scope of the above specification.

Having described my invention, I claim:

1. An apparatus for deploying specimen collectors at selected depths in a body of water from a moving craft comprising means forming an elongated hollow casing,
said casing having a lower end housing,
an extendable and retractable first cable in said craft with one end secured to the upper end of said casing,
a second cable with one end thereof secured to the lower end of said housing and a ballast weight secured to the opposite end thereof for minimizing the angular deflection of said casing from a vertical position when moved in said body of water, a plurality of pouch means secured to the outer periphery of said casing with each said pouch means having a plurality of self opening enclosure flaps engaged by a releasable closure holding means for independently holding the said flaps on each of said pouch means in closed position and retaining a compacted said specimen collector in each said pouch means, each said specimen collector having a slidable towing member secured on the inlet side thereof, a first and second independent holding lever corresponding to each said pouch means spaced around the periphery of said housing with each said lever independently pivoted for movement from a latched holding position to a release position, a flap release line for normally holding each said flap on said pouch in closed position with said line terminating in a slidable fastener means retained on each said second holding lever when in said holding position including spring means biased between said flap closure holding means and said casing for urging the release of said closure holding means against the restraining action of said lever for releasing said closure holding means from said flaps when said lever is moved to said release position, electro-mechanical means in said housing for sequentially operating each said levers from said latched holding position to said release position when sequentially electrically operated, a deployment weight corresponding to each said pouch and collector therein slidably positioned on said second cable for positioning in end to end relation along the upper portion of said cable when said apparatus is in idle position, a deployment line for each said collector with the said towing member thereof slidably on said line with each said line progressively increased in length with one end of each terminating in a fastener means slidably retained on said second lever corresponding with each collector with the opposite end of each said deployment line independently secured to a successive deployment weight in sequential relation to said collectors, a deployment fastener in series with each of said deployment lines secured at a successively lesser distance than the said first one thereof with said collector deployment fastener slidably retained on a corresponding said first holding lever when the latter is in said holding position for supporting said successive weights in said end to end relation on said upper portion of said second cable, electric means on said craft for manually and sequentially momentarily energizing said electro-mechanical means, electric conductors connecting said electrically operated means with said electro-mechanical means, a normally open closure means on each said specimen collector including a closure and retrieving line connected thereto of predetermined length with the end thereof secured to each said weight for closing each said collector when said deployment line is released and the said collector gravitates to its corresponding weight and the momentary operation of said electric means on said craft will momentarily energize said electromechanical means to operate same and release a said first lever to move from said holding to said release position to permit said lowermost weight to descend by gravity on said second cable and simultaneously operate said closure release member and permit said flaps to open and release said first collector corresponding to the lowermost said weight to descend along said deployment line to a lowermost position and open by the force of water therethrough for collecting marine specimens and the subsequent alternate sequential momentary operation of said electric means on said craft will sequentially release the remainder of said specimen collectors and deploy each at a different higher level depending upon the predetermined length of each said deployment line.

2. The construction recited in claim 1 wherein each said specimen collector is substantially conical in shape with the major portion thereof made of net-like fabric and the open input end collar connected by a plurality of shrouds to a towing ring which is slidably positioned for descending movement along the entire length of each said deployment lines with the small conical end thereof opening into a cylindrical specimen retention receptacle.

3. In an apparatus for deploying specimen collectors at a plurality of depths in a body of water from a moving craft comprising a main casing secured to a cable for measured descent in a body of water from said craft, a plurality of specimen collectors releasably secured to said casing including a tow means on each said collectors, a release means associated with each of said collectors and said casing for disengaging same from said casing when operated, a housing having a sealed central cavity therein secured to the lower end of said casing and including a plurality of pairs of first and second independent levers corresponding with each of said collectors and extending around the outside of said housing and manually movable from a holding position to a release position, a spring urged latch means operatively related with each said lever for holding same in said holding position when said latch means is engaged with a fixed circular striker edge centrally positioned in said housing, an electric stepping motor in said housing for sequentially rotating a sealed cam shaft coaxially projecting through the bottom of said housing and including a cam projection for sequentially releasing each said latch means from engagement with said striker edge when rotated, said motor and said projection adapted and constructed to sequentially rotate through a plurality of angles equal to the number of said levers when momentarily and sequentially energized for releasing each of said levers from its holding to its release position, a cable of predetermined length extending downward from said housing and terminating in a ballast weight secured at the lower end thereof, a plurality of deployment weights corresponding with said collectors slidably secured for gravity movement from an upper idle position to a predetermined selected deployment position and downward to a recovery position, deployment lines of progressive different predetermined lengths slidably through each said tow means of each collector and having one end of each thereof connected to each said weight and a slidable fastener means connected at predetermined progressive intermediate positions on each said line and said line terminating in a fastener means slidably retained on a lever corresponding with each said collector and the end of each said line terminating in a fastener means connected to the second of the pair of each said levers whereby each said collector will be deployed by said tow means on each of said deployment lines at a predetermined different depth from said housing corresponding to the position of each said weight and each said collector when the first of each pair of said levers is released by said latch means when said stepping motor is momentarily energized.

4. The construction recited in claim 3 including a combination specimen collector closure and recovery line of predetermined length with one end thereof secured to each of said deployment weights, a normally open closure means on the input portion of each said collector connected to the remaining end of said recovery line whereby the release of each deployment line will permit same to disengage from said corresponding tow line and permit each weight and said corresponding collector to gravitate to the lower portion of said cable with each said weight in stacked relation upon said ballast weight and subject to recovery with said apparatus.

5. The construction recited in claim 3 including a sealed closure member in the upper end of said housing, at least one transverse cylindrical bore in said closure member with the outer end thereof communicating to the outside of said housing and the inner end of said bore communicating with said central cavity, a piston having a sealing ring thereon slidably positioned in said bore, said cavity and all voids related thereto including the space on the inner side of said piston filled with predetermined neutral fluid whereby water pressure applied to the outside of said housing including the force against the bearing clearance and seal of said cam shaft will be neutralized by the equal and opposite pressure applied to the outer side of said piston through the said communication to the outer side of said cylinder.

6. The construction recited in claim 3 including an electric transmission system in said craft comprising an electric stepping motor and a single pole double throw alternate pulse relay and a momentary switch and a source of electric power and a first circuit means, a like stepping motor and like single pole double throw alternate pulse relay including a second circuit means connected to said first circuit means by a transmission circuit, each stepping motor having a number of contacts corresponding to the number of levers in said housing whereby the manual momentary operation of said momentary switch will energize like contacts in both stepping motors and each said relay to rotate said cam projection to release a first said specimen collector and permit the first said weight to deploy said first collector for obtaining specimens at a predetermined depth and whereby a second manual operation of said momentary switch will energize said stepping motors to contact said second contacts and energize each said relay to release said deployment line from its said lever and permit said recovery line to close said closure means of said deployed collector and permit said first weight and said first collector to gravitate to the lower end portion of said cable above said ballast weight for recovery, and the successive operation of said switch will sequentially deploy and release for recovery all said collectors on said apparatus.

* * * * *